No. 817,058. PATENTED APR. 3, 1906.
E. T. GREENFIELD.
COUPLING FOR ARMORED HOSE.
APPLICATION FILED JAN. 12, 1905.
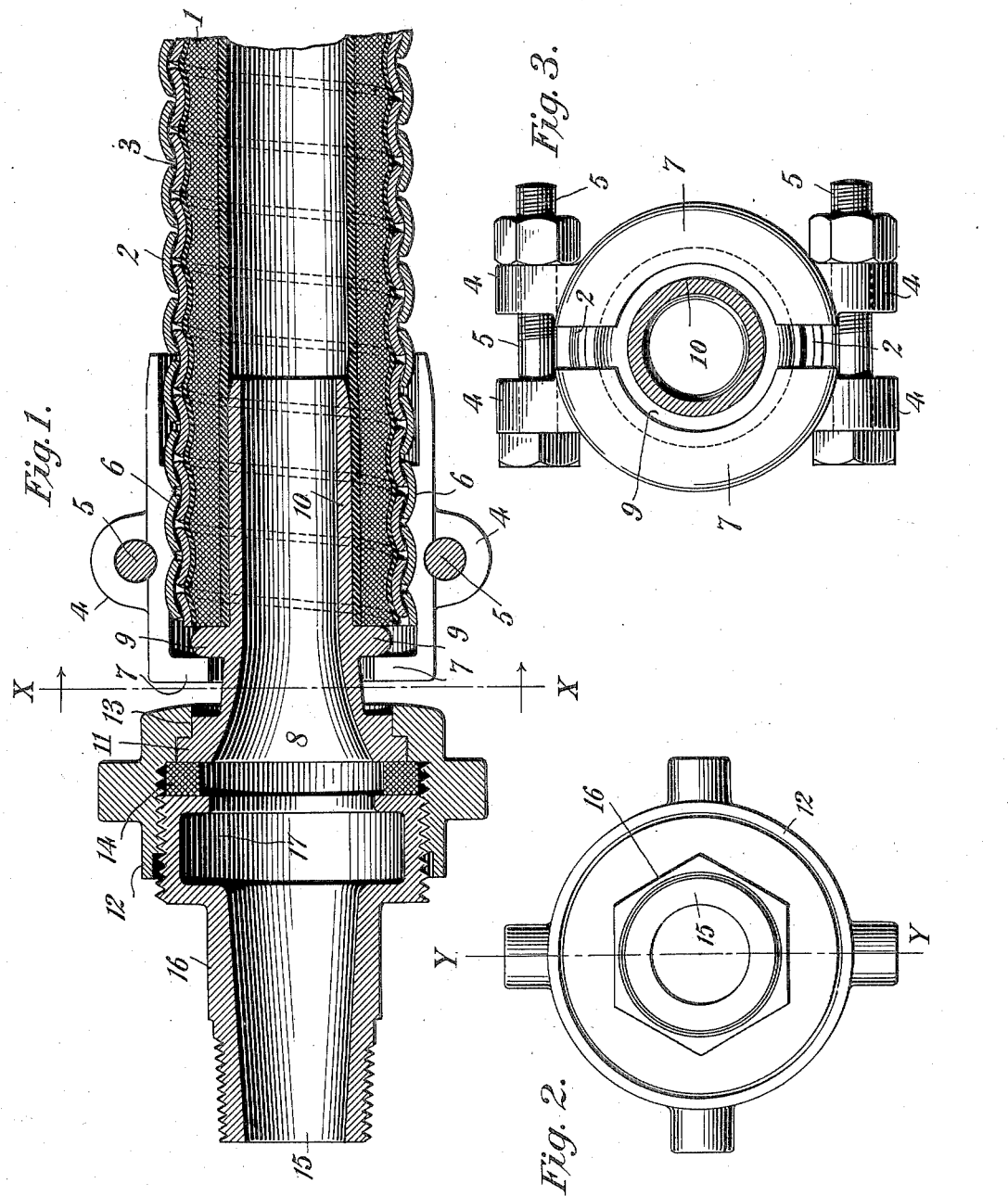
WITNESSES:
C. E. Ashley
M. F. Keating
INVENTOR
Edwin T. Greenfield
By his Attorney,
Charles J. Kintner

UNITED STATES PATENT OFFICE.

EDWIN T. GREENFIELD, OF MONTICELLO, NEW YORK.

COUPLING FOR ARMORED HOSE.

No. 817,058.　　　　Specification of Letters Patent.　　　　Patented April 3, 1906.

Application filed January 12, 1905. Serial No. 240,722.

*To all whom it may concern:*

Be it known that I, EDWIN T. GREENFIELD, a citizen of the United States, residing at Monticello, county of Sullivan, and State of New York, have made a new and useful Invention in Couplers for Armored Hose, of which the following is a specification.

My invention is directed particularly to improvements in couplers for armored hose like that disclosed in a prior application filed by me in the United States Patent Office on the 15th of October, 1904, Serial No. 227,314; and it has for its objects, first, to provide means whereby armored hose may be connected together in sectional lengths through the agency of a coupler in which there is a continuous metallic connection between the armor of the two sections of hose thus joined together and of such a nature that it is practically impossible to blow out the coupling connection by any pressure submitted to the hose from within; second, to adapt such a coupler for use with the coupling connection of a hydrant, steam-pipe, or the like; third, to provide a metallic coupler for armored hose of such a nature that a number of sections of such hose may be connected together in such a way as to give the greatest possible lineal strength to the hose, thereby making it possible to utilize hose of this nature when suspended from high elevations, as in the upper stories or from the tops of modern steel-frame buildings of great height.

My invention will be fully understood by referring to the accompanying drawings, in which—

Figure 1 is a longitudinal section, full size, of an armored hose, illustrating my improvement for attaching the same to the coupling connection of a hydrant, steam-pipe, or the like, one-half of one of the coupling-rings being shown in elevational view with the bolts for securing the same in sectional view. Fig. 2 is an end elevational view as seen looking at Fig. 1 from left to right. Fig. 3 is a transverse sectional view taken on the line X X and as seen looking thereat from left to right in the direction of the arrows.

Referring now to the drawings, in which like numerals represent like parts wherever used, 1 2 3 represent the flexible hose and the interlocking armor therefor of what is known in the art as the "Greenfield armored hose," disclosed in a prior patent granted to me by the United States Patent Office on the 8th day of December, 1903, and numbered 746,630.

6 6 represent half or two-part coupling-rings which are screw-threaded internally to conform to the spiral or screw-threaded conformation of the armor strips 2 3, said rings being provided with a pair of lugs or ears 4 4, adapted to receive bolts 5 5. Each half or two-part coupling-ring is provided at one end with an internally-projecting shoulder 7, adapted to bear when in locked position against a ring-shaped part 9, integral with a connecting-sleeve 10, bell-mouthed, as shown at 8, and provided with cylindrical shoulders 11 and 13, 12 being a connecting-ring screw-threaded internally and provided externally with radially-disposed integral lugs or pins for effecting the manipulation of the ring by a pipe-wrench.

14 is a water-tight gasket adapted to make a water-tight joint between the inner end of the cylindrical shoulder 11 and the abutting end of the coupling connection 16 of a hydrant, said connection being screw-threaded at its exterior end and cone-shaped interiorly, as shown at 15, 17 being an enlarged chamber near the outer end of the coupling connection.

The parts are put together as follows: Suppose the coupling connection 16 of the hydrant be secured by its screw-thread at the end 15 directly to the hydrant. The connecting-sleeve 10 is inserted with its small end through the ring 12, so that the shoulders 11 and 13 assume the position shown in Fig. 1. The end of the hose 1 is then forced over the outer end of the sleeve 10 until it abuts against the ring-shaped part 9. The two half coupling-rings 6 are then placed in position about the outer or armored portion of the hose, so that the internally-projecting shoulder 7 bears snugly against the ring-shaped part 9. The bolts 5 are then placed in the bolt-holes in the lugs or ears 4 and the nuts turned firmly home until all of the parts are securely bound together. The gasket 14 is then put in place and with a pipe-wrench acting upon the intergal pins of the connecting-ring 12 the hose is secured directly to the coupling connection 16.

It is obvious that for connecting two sections of hose together it would only be required that the connecting-sleeve 10 and its ring-shaped part 9 be duplicated—that is to say, a simple connecting-sleeve 10 be provided with two ring-shaped parts 9 near the center thereof, so that the two parts of each pair of half coupling-rings 6 shall grip its corresponding ring-shaped part 9.

An armored hose made up of sections connected together both interiorly and exteriorly in the manner hereinbefore described possesses great lineal strength at the points of connection, thereby making it possible to suspend such hose from points of high elevation, as upon the tops or from the upper stories of existing steel-frame buildings found in the large cities in the United States, and the great strength of the hose, due to the armor and the peculiar manner of connecting the same, makes it practically indestructible, either from tensile strain or internal pressures.

I do not limit my invention to the details of construction illustrated in the accompanying drawings, as a number of the features thereof might be departed from and still come within the scope of my claims hereinafter made.

Having thus described my invention, what I claim and desire to secure by Letters Patent of the United States, is—

1. A hose-coupler for a spirally-armored hose consisting of a two-part coupling-ring screw-threaded internally so as to conform to the spiral armor, each part being provided with an internally-projecting shoulder; in combination with a connecting-sleeve having an integral ring-shaped part adapted to bear against the internally-projecting shoulders and the end of the hose.

2. A hose-coupler for a spirally-armored hose consisting of a two-part coupling-ring screw-threaded internally so as to conform to the spiral armor, each part being provided with an internally-projecting shoulder; in combination with a connecting-sleeve having an integral ring-shaped part; together with means for attaching the connecting-sleeve to an additional connecting-ring.

3. A hose-coupler for a spirally-armored hose consisting of a two-part coupling-ring screw-threaded internally so as to conform to the spiral armor, each part being provided with an internally-projecting shoulder at one end; together with lugs or ears, bolt-holes and bolts for securing the parts together; in combination with an internally-disposed connecting-sleeve provided with integral means for securing it within the hose and in locked relation to the internally-projecting shoulders.

4. A hose-coupler for spirally-armored hose consisting of a two-part coupling-ring screw-threaded internally, each part being provided with an internally-projecting shoulder at one end; lugs or ears; bolt-holes and bolts; in combination with a connecting-sleeve provided with an internally-disposed ring-shaped part adapted to form a connection between the end of the hose and the internally-projecting shoulders, said sleeve having also additional shoulders at one end; a connecting-ring screw-threaded internally and provided with shoulders adapting it to be secured to the exterior end of the before-mentioned sleeve; a coupling connection provided with screw-threads for securing the before-mentioned ring, and a gasket adapted to make a water-tight connection between the connecting-sleeve and the coupling connection, all of said parts being constructed substantially as and for the purpose set forth.

In testimony whereof I have signed my name to this specification in the presence of two subscribing witnesses.

EDWIN T. GREENFIELD.

Witnesses:
C. J. KINTNER,
M. F. KEATING.